(12) United States Patent
Liberg et al.

(10) Patent No.: US 11,611,919 B2
(45) Date of Patent: Mar. 21, 2023

(54) NON-ANCHOR BASED RADIO RESOURCE MEASUREMENTS

(71) Applicant: Telefonaktiebolaget LM Ericsson (publ), Stockholm (SE)

(72) Inventors: Olof Liberg, Enskede (SE); Yutao Sui, Solna (SE); Yi-Pin Eric Wang, Fremont, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/278,748

(22) PCT Filed: Sep. 24, 2019

(86) PCT No.: PCT/EP2019/075642
§ 371 (c)(1),
(2) Date: Mar. 23, 2021

(87) PCT Pub. No.: WO2020/064694
PCT Pub. Date: Apr. 2, 2020

(65) Prior Publication Data
US 2022/0038971 A1     Feb. 3, 2022

Related U.S. Application Data

(60) Provisional application No. 62/735,554, filed on Sep. 24, 2018.

(51) Int. Cl.
*H04W 36/00* (2009.01)
*H04B 17/318* (2015.01)
(Continued)

(52) U.S. Cl.
CPC .... *H04W 36/00837* (2018.08); *H04B 17/318* (2015.01); *H04W 36/0058* (2018.08); *H04W 36/08* (2013.01); *H04W 36/30* (2013.01)

(58) Field of Classification Search
None
See application file for complete search history.

(56) References Cited

U.S. PATENT DOCUMENTS

2019/0190758 A1*  6/2019  Hwang ............... H04L 12/4612
2020/0029256 A1*  1/2020  Rico Alvarino .... H04W 68/005

FOREIGN PATENT DOCUMENTS

WO      2018151642 A1    8/2018

OTHER PUBLICATIONS

Unknown, Author, "Downlink channel quality report during random access procedure on a non-anchor carrier", 3GPP TSG RAN WG1 Meeting #94, R1-1808478, Gothenburg, Sweden,, Aug. 20-24, 2018, pp. 1-4.

(Continued)

*Primary Examiner* — Suhail Khan
(74) *Attorney, Agent, or Firm* — Christopher & Weisberg, P.A.

(57) ABSTRACT

According to an aspect, a wireless device (50) performs idle mode radio resource management, RRM, measurements in a wireless network comprising a first carrier that supports a broadcast of system information, provides radio resources for paging and random access, and supports idle-mode measurements and further comprises a second carrier, distinct from the first carrier, that also provides radio resources for paging and random access. The wireless device (50) performs (502) at least one of a signal strength measurement and quality measurement on each of the first and second carriers, the first carrier being an anchor carrier for the wireless device and the second carrier being a non-anchor carrier. Based on the at least one measurement for each of the respective carriers, the wireless device (50) determines (504) whether to perform idle-mode RRM measurements on the second, non-anchor, carrier.

23 Claims, 13 Drawing Sheets

(51) Int. Cl.
  *H04W 36/08* (2009.01)
  *H04W 36/30* (2009.01)

(56) References Cited

OTHER PUBLICATIONS

Unknown, Author, "On support of Msg3 quality reporting for non-anchor access", 3GPPTSG RAN WGJ Meeting#94, RI-1808110, Gothenburg, Sweden, Aug. 20-24, 2018, pp. 1-3.

* cited by examiner

500

```
┌─────────────────────────────────────┐
│ PERFORM A SIGNAL STRENGTH MEASUREMENT OR │
│ QUALITY MEASUREMENT, OR BOTH, ON EACH OF THE │
│ FIRST AND SECOND CARRIERS, THE FIRST AND SECOND │
│ CARRIERS BEING AN ANCHOR CARRIER AND NON- │
│ ANCHOR, RESPECTIVELY, FOR THE WIRELESS DEVICE │
│ 502 │
└─────────────────────────────────────┘
                    │
                    ▼
┌─────────────────────────────────────┐
│ BASED ON THE SIGNAL STRENGTH OR QUALITY │
│ MEASUREMENT, OR BOTH, FOR EACH OF THE │
│ RESPECTIVE CARRIERS, DETERMINE WHETHER TO │
│ PERFORM IDLE-MODE RRM MEASUREMENTS ON THE │
│ SECOND CARRIER │
│ 504 │
└─────────────────────────────────────┘
```

*FIG. 5*

NON-ANCHOR BASED RADIO RESOURCE MEASUREMENTS

TECHNICAL FIELD

The present disclosure generally relates to the field of wireless network communications and more particularly, to wireless devices that operate on multiple carriers.

BACKGROUND

In Release 13 of its wireless network standards, the 3rd-Generation Partnership Project (3GPP) produced specifications for the so-called Narrowband Internet of Things, or NB-IoT. This radio access technology provides connectivity to services and applications demanding reliable indoor coverage and high capacity in combination with low system complexity and optimized power consumption.
Anchor Carrier The minimum system bandwidth in NB-IoT is 200 kHz. In this basic setup, an NB-IoT anchor carrier is transmitted in the cell. It supports basic cellular functionality such as synchronization and the broadcast of system information, as well as providing for paging and random access. The anchor carrier is also used by devices to perform idle-mode measurements, such as signal strength (NRSRP) and signal quality (NRSRQ) measurements, to support idle-mode mobility. According to conventional terminology, a device can, when operating in idle mode, thus be said to "camp" on an NB-IoT cell based on the anchor carrier transmissions.
Non-Anchor Carrier To improve system capacity, NB-IoT can be configured as a multi-carrier system where the anchor carrier is complemented by a set of non-anchor carriers, each having a bandwidth of 200 kHz. The non-anchor carriers support not only data transmission, but also paging and random access. However, Release 13 of the 3GPP specifications do not provide support for idle-mode measurements on a non-anchor carrier, and a device hence cannot be said to "camp" on a non-anchor carrier, even though it is configured to perform random access and listen to paging on the non-anchor carrier.

SUMMARY

A device configured for non-anchor paging/random access may need to perform frequent radio frequency (RF) switching between the anchor carrier (for camping/Radio Resource Management (RRM) measurements) and the non-anchor carrier (for paging/random access). This is power consuming and may limit the device's operational life time.

Embodiments of the present invention allow a device to temporarily camp on the non-anchor carrier configured for paging/random access and perform a limited set of RRM measurement procedures on the non-anchor carrier. Included in the limited set of RRM measurements is a novel procedure in which the device establishes a relationship between the signal strength and/or quality on the anchor and the signal strength and/or quality of the non-anchor, which allows the device to use the non-anchor measurements for detecting idle-mode mobility.

Embodiments disclosed herein include a method, performed by a wireless device, for performing idle mode RRM measurements in a wireless network comprising a first carrier that supports a broadcast of system information, provides radio resources for paging and random access, and supports idle-mode measurements and further comprising a second carrier, distinct from the first carrier, that also provides for paging and random access. This method includes the wireless device performing at least one of a signal strength measurement and quality measurement on each of the first and second carriers, the first carrier being an anchor carrier for the wireless device and the second carrier being a non-anchor carrier for the wireless device. The method also includes, based on the at least one measurement for each of the respective carriers, determining whether to perform idle-mode RRM measurements on the second, non-anchor, carrier.

Other embodiments disclosed herein include a wireless device adapted to perform idle mode RRM measurements in wireless network comprising a first carrier that supports a broadcast of system information, provides radio resources for paging and random access, and supports idle-mode measurements and further comprises a second carrier, distinct from the first carrier, that also provides for paging and random access The wireless device includes transceiver circuitry configured for communicating with a wireless communication network on the first and second carriers. The wireless device also includes processing circuitry operatively associated with the transceiver circuitry and configured to perform at least one of a signal strength measurement and quality measurement on each of the first and second carriers, the first carrier being an anchor carrier for the wireless device and the second carrier being a non-anchor carrier for the wireless device. The wireless device is further configured to, based on the at least one measurement for each of the respective carriers, determine whether to perform idle-mode RRM measurements on the second, non-anchor, carrier.

Other embodiments disclosed herein include a method, performed by a network node. The method being for facilitating idle mode radio resource management, RRM, measurements in a wireless network performed by a network node. The method comprising signaling, to a wireless device in the network, one or more conditions for permitting the wireless device to perform RRM measurements on a non-anchor carrier for the wireless device.

Other embodiments disclosed herein include a network node adapted for facilitating idle mode radio resource management, RRM, measurements in a wireless network. The network node comprising transceiver circuitry configured for communicating with a wireless communication network on the first and second carriers and processing circuitry operatively associated with the transceiver circuitry. The processing circuitry being configured to signal, to a wireless device in the network, one or more conditions for permitting the wireless device to perform RRM measurements on a non-anchor carrier for the wireless device.

Further aspects of the present invention are directed to an apparatus, wireless device, computer program products or computer readable storage medium corresponding to the methods summarized above and functional implementations of the above-summarized apparatus and wireless device.

An advantage of the embodiments is that they allow a wireless device to limit its RF switching to save power.

Of course, the present invention is not limited to the above features and advantages. Those of ordinary skill in the art will recognize additional features and advantages upon reading the following detailed description, and upon viewing the accompanying drawings.

BRIEF DESCRIPTION OF THE FIGURES

FIG. 5 illustrates a flow diagram of a method at the wireless device for performing Radio Resource Management (RRM) measurements, according to some embodiments.

DETAILED DESCRIPTION

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment.

Figure 1:
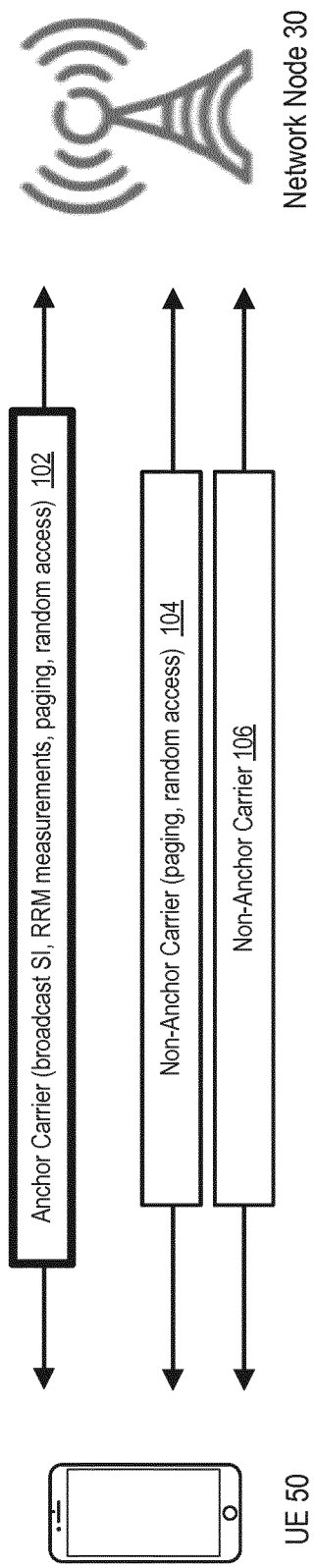
FIGS. 1 and 2 illustrate the use of anchor and non-anchor carriers by a UE, according to some embodiments.

FIG. 1 illustrates an anchor carrier 102 and non-anchor carriers 104, 106 used by a wireless device 50 (e.g., user equipment, or UE) in communication with one or more network nodes 30 in a network. Anchor carrier 102 is used for broadcast of system information, paging and random access, and idle-mode measurements. Non-anchor carrier 104 is configured for the UE for paging and random access. Because UE 50 performs RRM measurements on anchor carrier 102, anchor carrier 102 is highlighted in FIG. 1.

Figure 2:
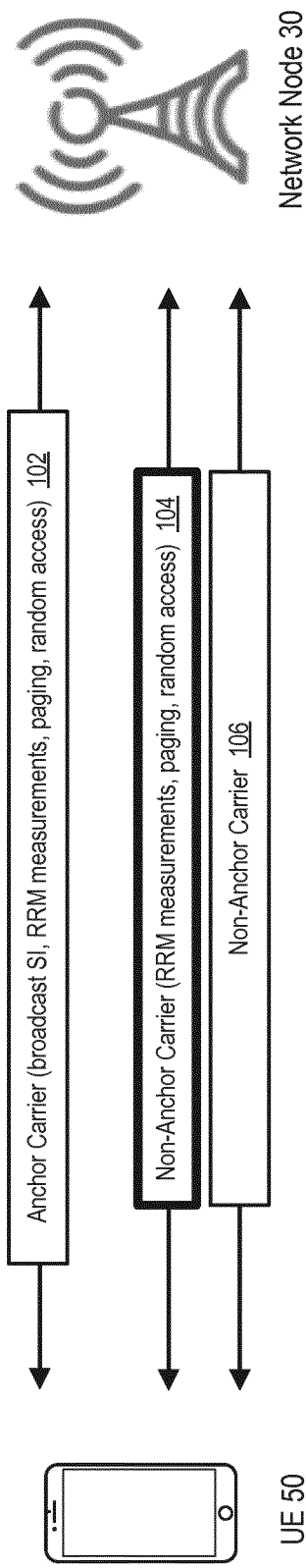

According to some embodiments, UE 50 measures a signal quality for each of the serving cell anchor carrier 102 and the paging/random access non-anchor carrier 104. These measurements of the signal quality, which may be absolute (i.e., not relative measurements), may be averaged or weighted, and may comprise signal strength or quality measurements (e.g., signal-to-noise ratio or signal-to-noise-plus-interference), or some combination of both. The measured signal quality measurements for anchor carrier 102 and non-anchor carrier 104 are then compared to a pre-configured threshold, e.g., an absolute signal strength/quality threshold. If the (average or weighted average) signal strength/quality for both cases are above the threshold, UE 50 may initiate idle-mode RRM measurements on non-anchor carrier 104, on which it is already monitoring paging and/or random access, as shown by highlighted non-anchor carrier 104 in FIG. 2. Thus, UE 50 can suspend RRM measurements on anchor carrier 102 and reduce the need for RF switching. Note that the RRM measurements referred to herein may comprise idle-mode measurements made by UE 50 for use in making idle-mode mobility decisions.

In a first aspect of these first embodiments, if non-anchor carrier 104 signal strength/quality at a later instance, or at several instances, or an average (or weighted average) of several instances, drops below a threshold, UE 50 must resume idle-mode RRM measurements on anchor carrier 102.

In a second aspect of these first embodiments, if non-anchor carrier 104 signal strength/quality at a later instance or instances or an average (or weighted average) of several instances changes so that the difference, the delta, between the two most recent non-anchor measurements exceeds a threshold, UE 50 must resume idle-mode RRM measurements on anchor carrier 102. It will be appreciated that exceeding this threshold indicates that the signal strength or quality of non-anchor carrier 104 has changed significantly, and thus RRM measurements on non-anchor carrier 104 may no longer be a viable substitute for RRM measurements on anchor carrier 102.

In a third aspect of these first embodiments, UE 50 is configured to resume idle-mode RRM measurements on anchor carrier 102 (and thus discontinue RRM measurements on non-anchor carrier 104) after a certain time configured by the network.

In a fourth aspect of these first embodiments, if non-anchor carrier 104 signal strength/quality at a later instance, or instances, or an average (or weighted average) of several instances, drops below a threshold, UE 50 can perform cell reselection directly, using the most recent measured anchor signal strength, the most recent non-anchor signal strength, or a combination of the two as input into the cell reselection procedure, without resuming idle-mode RRM measurements on anchor carrier 102.

According to a variant of the embodiments discussed above, UE 50 measures the signal strength/quality for each of serving cell anchor carrier 102 and paging/random access non-anchor carrier 104 and compares them to each other to establish their difference, or delta. If this difference is below a certain threshold, UE 50 may initiate idle-mode RRM measurements on non-anchor carrier 104 on which it monitors paging and/or random access, and thus not perform RRM measurements on anchor carrier 102, at least temporarily.

In a first aspect of this second group of embodiments, if non-anchor carrier 104 signal strength/quality at a later instance, or instances, or an average (or weighted average) of several instances changes so that the delta between the most recent anchor and non-anchor measurements exceeds a threshold, UE 50 must resume idle-mode RRM measurements on anchor carrier 102, and thus, for example discontinue RRM measurements on non-anchor carrier 104.

In a second aspect of this second group of embodiments, if non-anchor carrier 104 signal strength/quality at a later instance, or instances, or an average (or weighted average) of several instances, changes so that the delta between the most recent anchor and non-anchor measurements exceeds a threshold, UE 50 can perform cell reselection directly without resuming idle-mode RRM measurements on anchor carrier 102.

In a third aspect of this second group of embodiments, the threshold that is used by the device to determine whether it needs to perform idle-mode RRM measurements on anchor carrier 102 or non-anchor carrier 104 is set based on the transmit power difference between anchor and non-anchor carriers 102, 104. In some embodiments, the power difference between anchor and non-anchor carriers 102, 104 may be inferred from nrs-PowerOffsetNonAnchor, which is a field within the information element CarrierConfigDedicated-NB.

As an alternative to the wanted signal power and quality, these methods may be based, at least in part, on measured noise and interference levels on anchor and non-anchor carriers 102, 104. Thus, for example, the determination of whether to initiate RRM measurements on non-anchor carrier 104 and/or the decision to resume RRM measurements on anchor carrier 102 may be at least partly based on noise and/or interference measurements.

According to some embodiments, UE 50 can be informed by the network whether the same carrier on which it monitors paging/random access (the non-anchor carrier 104) is also used in the neighboring cell for cell reselection. If the quality of non-anchor carrier 104 UE 50 measures falls below a certain threshold, UE 50 can perform measurements on the same carrier in the neighboring cell for cell reselection.

In a first aspect of these embodiments, the network can indicate whether cell reselection can be directly performed based the signal quality/strength of non-anchor carrier 104. If configured, UE 50 can skip the RRM measurements on anchor carrier 104 before performing the cell reselection procedures.

In a second aspect of these embodiments, the network can transmit related information about the neighboring cell non-anchor configurations, e.g., frequency, NRS configurations, etc., to assist UE 50 with measuring non-anchor carrier 104 in the neighboring cells.

In some embodiments of the various techniques described herein, a set of conditions for permitting a wireless device 50 to camp (i.e., perform RRM measurements) on a non-anchor carrier is signaled to the wireless device by the network. Thus, for example, any of the methods described above may be preceded by a determination of whether the wireless device 50 is permitted to perform RRM measurements on a non-anchor carrier 104. This determination, in some embodiments, may be made without regard to signal measurements.

In one example, permission is given to devices with a short Discontinuous Reception (DRX) or eDRX cycle. Short implies a configured cycle length below a certain threshold value. This approach allows the reduction of RF switching when it matters the most, as long DRX cycles imply less frequent RF switching. In a second example, permission is given to devices in one more well-defined and contained coverage levels.

It will be appreciated that for a wireless device 50 in extended coverage it is highly important to correctly determine the strength of the serving cell. One reason is that the device is likely closer to the cell border, and more likely to change cells. In this scenario, it is less interesting to let the device measure on non-anchor carrier 104, which may be providing lower quality measurements than the anchor carrier 102. In still another example, permission is given to devices that are of a specific category, e.g., devices with high requirements on low power consumption, or devices that are stationary.

In various embodiments, the rules (e.g., based on configured DRX cycle and estimated coverage level) that apply for when to activate the methods described above are fixed by the specifications or signaled to the devices.

While the techniques are described above in the specific context of NB-IoT, these techniques are more generally applicable to systems in which camping for a particular device is performed on one carrier, while paging and/or random access is performed on another. Thus, these techniques may be applied to LTE MTC (Machine Type Communications) technologies, such as the LTE-M technologies. Further, it will be appreciated that while the terms "anchor" and "non-anchor" are used herein, this terminology may not be utilized in every system or scenario in which these techniques are applicable. Thus, it will be appreciated that "anchor" and "non-anchor" carriers may simply be considered "first" and "second" carriers, where RRM measurements are performed on the first carrier but paging and/or random access are supported on the second carrier.

Figure 3:
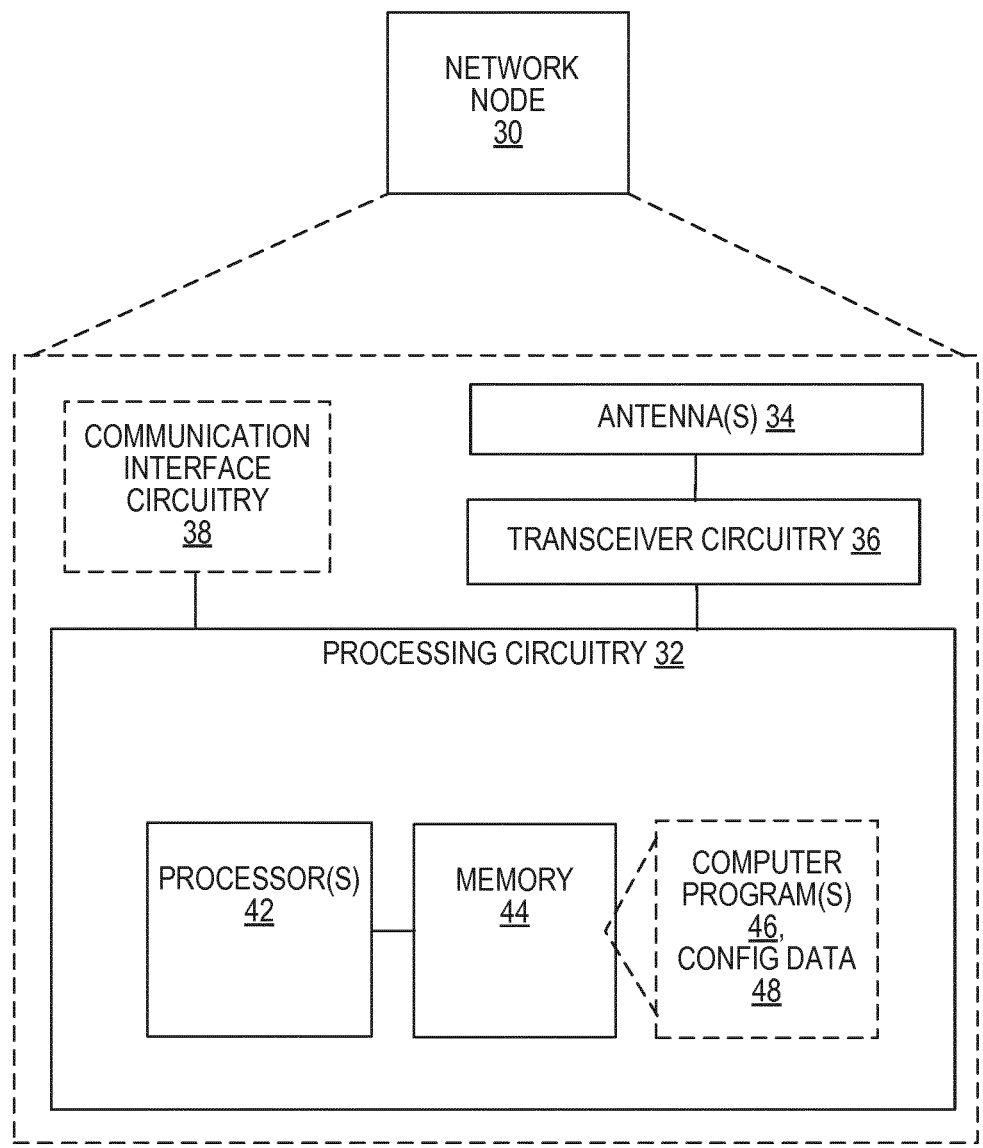
FIG. 3 illustrates a block diagram of an example network node.

FIG. 3 shows a network node 30, which may be configured to carry out any operations that support NB-IoT non-anchor camping for reducing wireless device power consumption. Network node 30 may be an evolved Node B (eNodeB), Node B or gNB, for instance, but the network node operations described herein can be performed by other kinds of network access nodes or relay nodes. In the non-limiting embodiments described below, network node 30 will be described as being configured to operate as a network node for NB-IoT devices or a cellular network access node in an LTE network or NR network.

Those skilled in the art will readily appreciate how each type of node may be adapted to carry out one or more of the methods and signaling processes described herein, e.g., through the modification of and/or addition of appropriate program instructions for execution by processing circuitry 32.

Network node 30 facilitates communication between wireless terminals, other network access nodes and/or the core network. Network node 30 may include communication interface circuitry 38 that includes circuitry for communicating with other nodes in the core network, radio nodes, and/or other types of nodes in the network for the purposes of providing data and/or cellular communication services. Network node 30 communicates with wireless devices using antennas 34 and transceiver circuitry 36. Transceiver circuitry 36 may include transmitter circuits, receiver circuits, and associated control circuits that are collectively configured to transmit and receive signals according to a radio access technology, for the purposes of providing cellular communication services.

Network node 30 also includes one or more processing circuits 32 that are operatively associated with transceiver circuitry 36 and, in some cases, communication interface circuitry 38. Processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, processing circuitry 32 may comprise fixed circuitry, or programmable circuitry that is specially configured via the execution of program instructions implementing the functionality taught herein, or may comprise some mix of fixed and programmed circuitry. Processor 42 may be multi-core, i.e., having two or more processor cores utilized for enhanced performance, reduced power consumption, and more efficient simultaneous processing of multiple tasks.

Processing circuitry 32 also includes a memory 44. Memory 44, in some embodiments, stores one or more computer programs 46 and, optionally, configuration data 48. Memory 44 provides non-transitory storage for computer program 46 and it may comprise one or more types of computer-readable media, such as disk storage, solid-state memory storage, or any mix thereof. Here, "non-transitory"

means permanent, semi-permanent, or at least temporarily persistent storage and encompasses both long-term storage in non-volatile memory and storage in working memory, e.g., for program execution. By way of non-limiting example, memory 44 comprises any one or more of SRAM, DRAM, EEPROM, and FLASH memory, which may be in the processing circuitry 32 and/or separate from processing circuitry 32. Memory 44 may also store any configuration data 48 used by network access node 30. Processing circuitry 32 may be configured, e.g., through the use of appropriate program code stored in memory 44, to carry out one or more of the methods and/or signaling processes detailed hereinafter.

Processing circuitry 32 of network node 30 is configured, according to some embodiments, to support NB-IoT non-anchor camping for reducing power consumption of a wireless device, such as wireless device 50.

Figure 13:
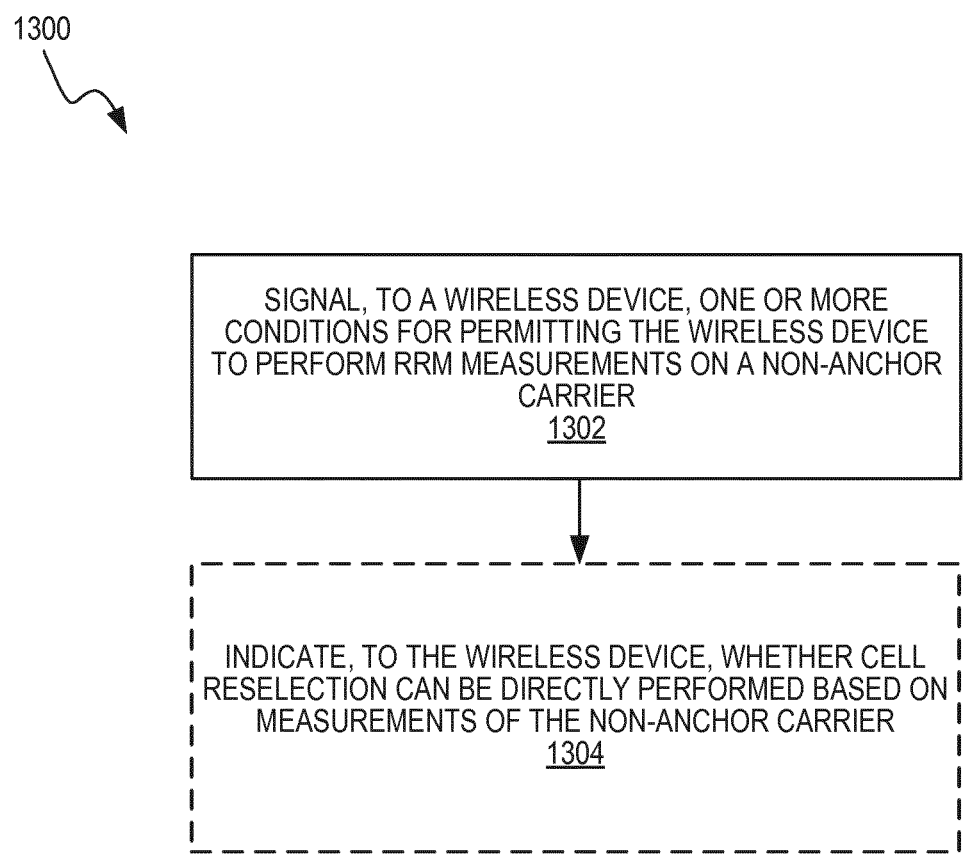
FIG. 13 illustrates a flow diagram of a method at the network node for facilitating idle mode RRM measurements by the wireless device, according to some embodiments.

More particularly, the processing circuitry 32 of network node 30 may be configured to carry out a method 1300, as shown in FIG. 13, for facilitating idle mode RRM measurements in a wireless network, where the method comprises, as shown in block 1302, signaling, to a wireless device in the network, one or more conditions for permitting the wireless device to perform RRM measurements on a non-anchor carrier for the wireless device. In some embodiments, for example, the method may comprise signaling, to the wireless device, a threshold for use by the wireless device in determining whether to perform RRM measurements on a non-anchor carrier for the wireless device.

As discussed above, the network can indicate to the wireless device whether the same carrier on which the wireless device monitors paging/random access (the non-anchor carrier 104) is also used in the neighboring cell for cell reselection. This is illustrated at block 1304 of FIG. 13, which indicates that the illustrated method may optionally include the step of indicating, to the wireless device, whether cell reselection can be directly performed based on one or more measurements of the non-anchor carrier. If the quality of the non-anchor carrier as measured by the wireless device falls below a certain threshold, for instance, the wireless device can perform measurements on the same carrier in the neighboring cell for cell reselection.

Figure 4:
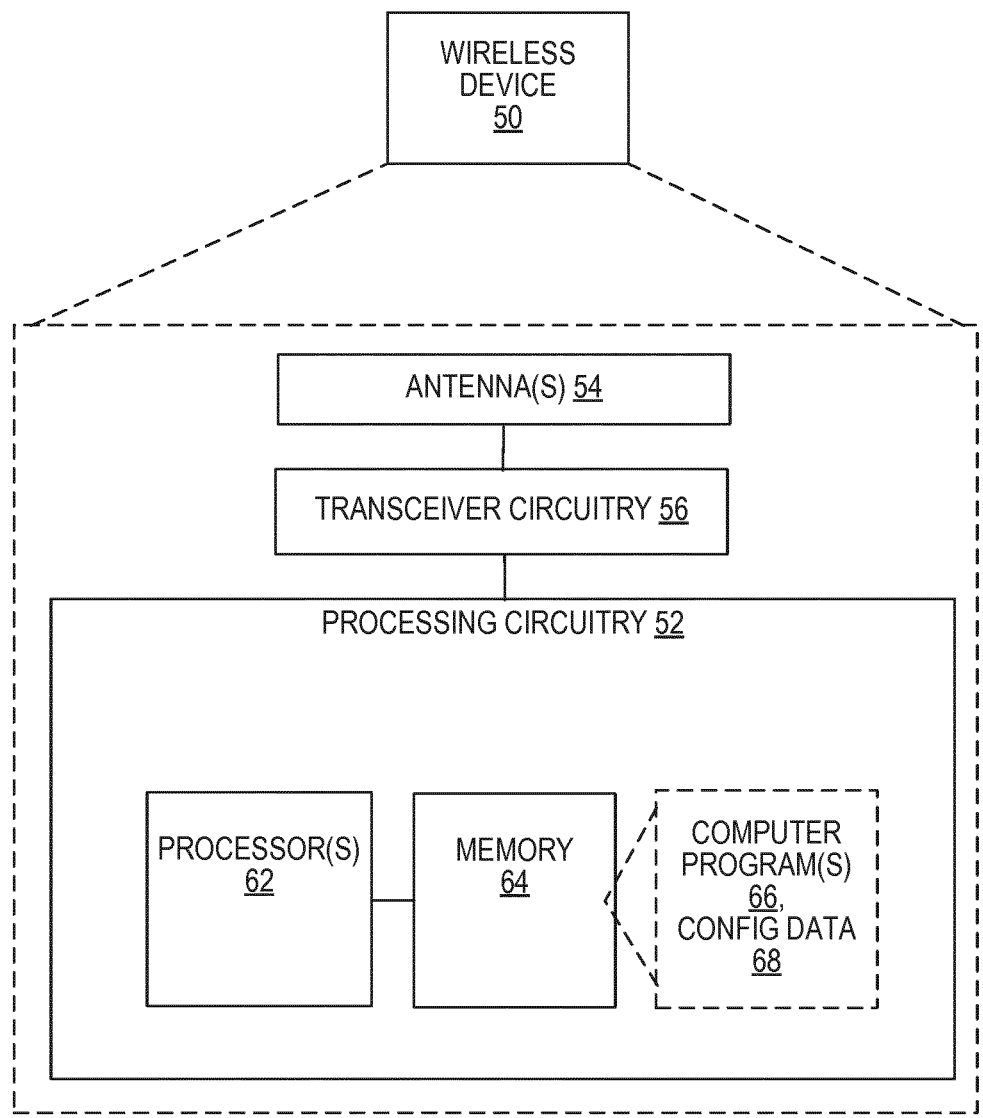
FIG. 4 illustrates a block diagram of a wireless device, according to some embodiments.

As discussed above, the network node can transmit related information about the neighboring cell non-anchor configurations, e.g., frequency, NRS configurations, etc., to assist the wireless device with measuring the non-anchor carrier. FIG. 4 illustrates a diagram of wireless device 50 configured to carry out one or more of the disclosed techniques, according to some embodiments. Wireless device 50 may be considered to represent any wireless terminals that may operate in a network, such as a UE in a cellular network. Other examples may include a communication device, target device, device to device (D2D) UE, machine type UE or UE capable of machine to machine communication (M2M), a sensor equipped with UE, PDA (personal digital assistant), Tablet, mobile terminal, smart phone, laptop embedded equipped (LEE), laptop mounted equipment (LME), USB dongles, Customer Premises Equipment (CPE), etc.

Wireless device 50 is configured to communicate with a network node as an NB-IoT device, or with a base station in a wide-area cellular network via antennas 54 and transceiver circuitry 56. Transceiver circuitry 56 may include transmitter circuits, receiver circuits, and associated control circuits that are collectively configured to transmit and receive signals according to a radio access technology, for the purposes of using cellular communication services. This radio access technologies are NB-IoT, NR and LTE for the purposes of this discussion.

Wireless device 50 also includes one or more processing circuits 52 that are operatively associated with radio transceiver circuitry 56. Processing circuitry 52 comprises one or more digital processing circuits, e.g., one or more microprocessors, microcontrollers, DSPs, FPGAs, CPLDs, ASICs, or any mix thereof. More generally, processing circuitry 52 may comprise fixed circuitry, or programmable circuitry that is specially adapted via the execution of program instructions implementing the functionality taught herein, or may comprise some mix of fixed and programmed circuitry. Processing circuitry 52 may be multi-core.

Processing circuitry 52 also includes a memory 64. Memory 64, in some embodiments, stores one or more computer programs 66 and, optionally, configuration data 68. Memory 64 provides non-transitory storage for computer program 66 and it may comprise one or more types of computer-readable media, such as disk storage, solid-state memory storage, or any mix thereof. By way of non-limiting example, memory 64 comprises any one or more of SRAM, DRAM, EEPROM, and FLASH memory, which may be in processing circuitry 52 and/or separate from processing circuitry 52. Memory 64 may also store any configuration data 68 used by wireless device 50. Processing circuitry 52 may be configured, e.g., through the use of appropriate program code stored in memory 64, to carry out one or more of the methods and/or signaling processes detailed hereinafter.

Processing circuitry 52 of wireless device 50 is configured, according to some embodiments, to operate on a first carrier, the first carrier (e.g., anchor carrier) supporting a broadcast of system information, providing for paging and random access, and supporting idle-mode measurements, the wireless device being further adapted for operation on a second carrier (e.g., non-anchor carrier), distinct from the first carrier, the second carrier also providing for paging and random access. The first carrier may thus be an anchor carrier for wireless device 50, while the second carrier is a non-anchor carrier for the wireless device 50. The carriers may be NB-IoT carriers, LTE carriers or LTE-M carriers. Consistently with the techniques described herein, the wireless device 50 is adapted to perform idle mode RRM measurements in a wireless network comprising a first carrier and second carrier as described above. More particularly, processing circuitry 52 is configured to perform a signal strength measurement or quality measurement, or both, on each of the first and second carriers. Put slightly differently, processing circuitry 52 is configured to perform at least one of a signal strength measurement and a signal quality measurement on each of the first and second carriers. Processing circuitry 52 is also configured to, based on the at least one measurement for each of the respective carriers, i.e., based on the signal strength or quality measurement, or both, for each of the respective carriers, determine whether to perform idle-mode RRM measurements on the second carrier.

Processing circuitry 52 may be configured, e.g., using appropriate program code stored in memory 44 for execution by processor(s) 42, to perform a method 500, as shown in FIG. 5. Consistently with the techniques discussed above, method 500 is a method, performed by a wireless device such as wireless device 50, for performing idle mode RRM measurements in a wireless network comprising a first carrier that supports a broadcast of system information, provides radio resources for paging and random access, and supports idle-mode measurements and further comprising a second carrier, distinct from the first carrier, that also provides radio resources for paging and random access. More specifically, method 500 includes performing a signal strength measurement or signal quality measurement, or both, on each of the first and second carriers (block 502). Put slightly differently, this step involves performing at least one of a signal strength measurement and a signal quality measurement on each of the first and second carriers, where, again, the first carrier is an anchor carrier for the wireless device and the second carrier is a non-anchor carrier for the wireless device. Based on the signal strength or quality measurement, or both, for each of the respective carriers, i.e., based on the at least one measurement for each of the respective carriers, the wireless device determines whether to perform idle-mode RRM measurements on the second, non-anchor, carrier (block 504).

According to some embodiments, method 500 includes comparing the signal strength measurement or quality measurement for each of the first and second carriers to a first pre-configured threshold and, in response to determining that the signal strength measurement or quality measurement for both of the first and second carriers exceeds the first pre-configured threshold, determining to perform idle-mode RRM measurements on the second carrier and to discontinue idle-mode RRM measurements on the first carrier. The signal strength or quality measurement for each of the first and second carriers may be an average or weighted average measurement.

According to some embodiments, method 500 further includes subsequently resuming idle-mode RRM measurements on the first carrier, in response to determining that one or a predetermined number of signal strength measurements or quality measurements for the second carrier fall below a second pre-configured threshold. When idle-mode RRM measurements resume on the first carrier, idle-mode RRM measurements on the second carrier may then be discontinued.

According to some embodiments, method 500 further includes subsequently resuming idle-mode RRM measurements on the first carrier, in response to determining that one or an average of several signal strength measurements or quality measurements for the second carrier falls below one or an average of several previous signal strength measurements or quality measurements by at least a predetermined difference.

According to some embodiments, method 500 further includes subsequently resuming idle-mode RRM measurements on the first carrier, in response to determining that idle-mode RRM measurements have been performed on the second carrier for a predetermined period of time. Note that any of the embodiments for resuming idle-mode RRM measurements may be combined with one another.

Method 500 may also include performing cell-reselection, using most recent signal strength measurements or quality measurements for each of the first and second carriers, in response to determining that one or a predetermined number of signal strength measurements or quality measurements for the second carrier fall below a pre-configured threshold.

Method 500 may include comparing the signal strength measurement or quality measurement for the first carrier to the respective signal strength measurement for the second carrier, and, in response to determining that a difference between the signal strength measurement or quality measurement for the first and second carriers is below a pre-configured delta threshold, determining to initiate idle-mode RRM measurements on the second carrier and to discontinue idle-mode RRM measurements on the first carrier. The pre-configured delta threshold may serve to establish that the second carrier can be used for idle-mode RRM measurements if the signal strength measurement or quality measurement for the first and second carriers are pretty close.

According to some embodiments, method 500 may further include subsequently resuming idle-mode RRM measurements on the first carrier, in response to determining that one or an average of several signal strength measurements or quality measurements for the second carrier falls below one or an average of several previous signal strength measurements or quality measurements by at least a predetermined difference. The evaluation may also consider the delta between the two most recent non-anchor measurements.

Method 500 may include subsequently performing cell-reselection, using most recent signal strength measurements or quality measurements for each of the first and second carriers, in response to determining that one or an average of several signal strength measurements or quality measurements for the second carrier falls below one or an average of several previous signal strength measurements or quality measurements by at least a predetermined difference.

The pre-configured delta threshold may be set based on a transmit power difference between the first carrier and the second carrier. Method 500 may further include inferring the transmit power difference based on a power offset information element received by the wireless device.

Figure 6:
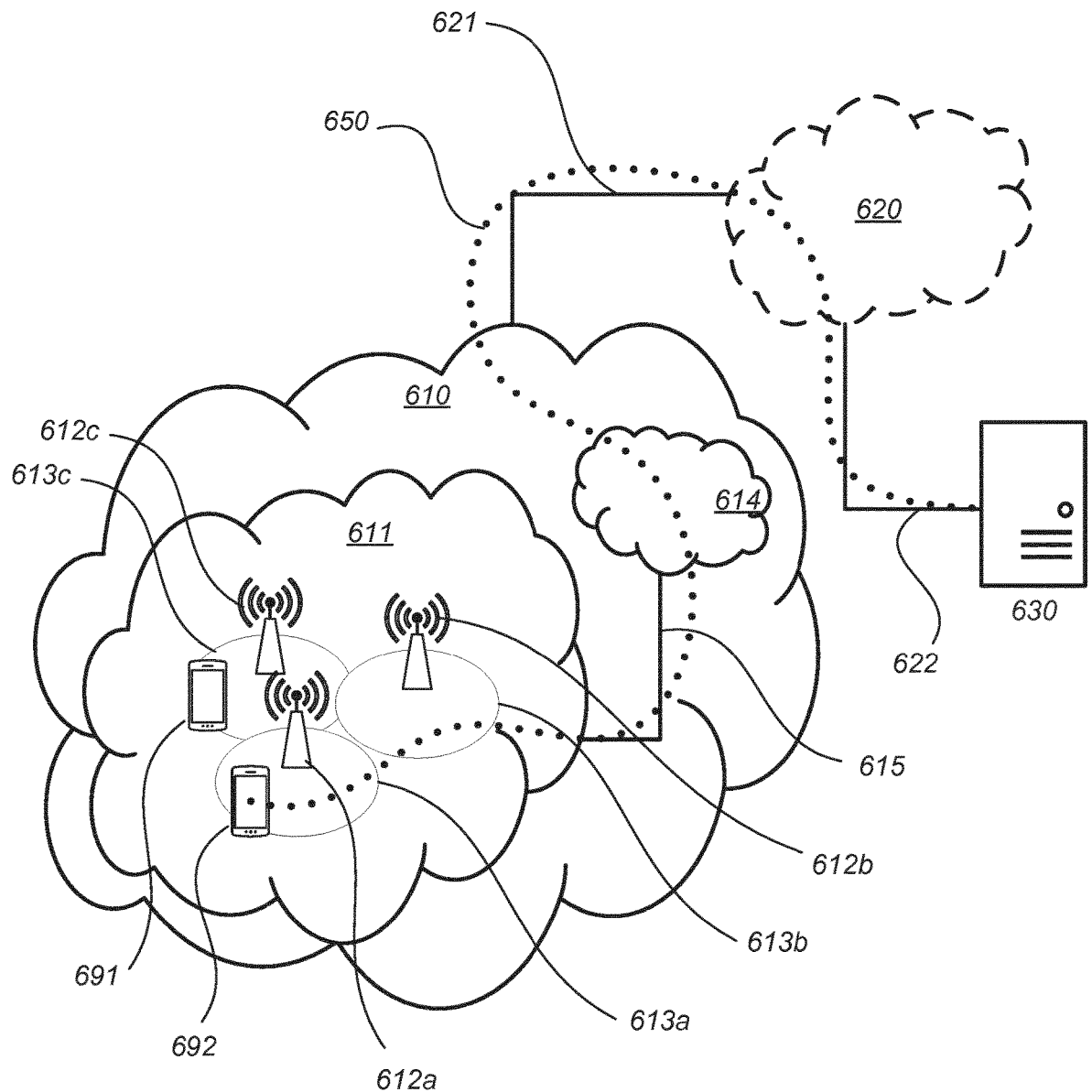
FIG. 6 schematically illustrates a telecommunication network connected via an intermediate network to a host computer, according to some embodiments.

FIG. 6 illustrates a communication system that includes a telecommunication network 610, such as a 3GPP-type cellular network, which comprises an access network 611, such as a radio access network, and a core network 614. The access network 611 comprises a plurality of base stations 612a, 612b, 612c, such as NBs, eNBs, gNBs or other types of wireless access points, each defining a corresponding coverage area 613a, 613b, 613c. Each base station 612a, 612b, 612c is connectable to the core network 614 over a wired or wireless connection 615. A first UE 691 located in coverage area 613c is configured to wirelessly connect to, or be paged by, the corresponding base station 612c. A second UE 692 in coverage area 613a is wirelessly connectable to the corresponding base station 612a. While a plurality of UEs 691, 692 are illustrated in this example, the techniques described herein are equally applicable to a situation where a sole UE is in the coverage area or where a sole UE is connecting to the corresponding base station 612.

The telecommunication network 610 is itself connected to a host computer 630, which may be embodied in the hardware and/or software of a standalone server, a cloud-implemented server, a distributed server or as processing resources in a server farm. The host computer 630 may be under the ownership or control of a service provider, or may be operated by the service provider or on behalf of the service provider. The connections 621, 622 between the telecommunication network 610 and the host computer 630 may extend directly from the core network 614 to the host computer 630 or may go via an optional intermediate network 620. The intermediate network 620 may be one of, or a combination of more than one of, a public, private or hosted network; the intermediate network 620, if any, may be a backbone network or the Internet; in particular, the intermediate network 620 may comprise two or more subnetworks (not shown).

The communication system of FIG. 6 as a whole enables connectivity between one of the connected UEs 691, 692 and the host computer 630. The connectivity may be described as an over-the-top (OTT) connection 650. The host computer 630 and the connected UEs 691, 692 are configured to communicate data and/or signaling via the OTT connection 650, using the access network 611, the core network 614, any intermediate network 620 and possible further infrastructure (not shown) as intermediaries. The OTT connection 650 may be transparent in the sense that the participating communication devices through which the OTT connection 650 passes are unaware of routing of uplink and downlink communications. For example, a base station 612 may not or need not be informed about the past routing of an incoming downlink communication with data originating from a host computer 630 to be forwarded (e.g., handed over) to a connected UE 691. Similarly, the base station 612 need not be aware of the future routing of an outgoing uplink communication originating from the UE 691 towards the host computer 630.

Example implementations of the UE, base station and host computer discussed in the preceding paragraphs will now be described with reference to FIG. 7. In a communication system 700, a host computer 710 comprises hardware 715 including a communication interface 716 configured to set up and maintain a wired or wireless connection with an interface of a different communication device of the communication system 700. The host computer 710 further comprises processing circuitry 718, which may have storage and/or processing capabilities. In particular, the processing circuitry 718 may comprise one or more programmable processors, application-specific integrated circuits, field programmable gate arrays or combinations of these (not shown) adapted to execute instructions. The host computer 710 further comprises software 711, which is stored in or accessible by the host computer 710 and executable by the processing circuitry 718. The software 711 includes a host application 712. The host application 712 may be operable to provide a service to a remote user, such as a UE 730 connecting via an OTT connection 750 terminating at the UE 730 and the host computer 710. UE 730 may correspond to the wireless device 50, as illustrated in FIG. 4 and discussed above. In providing the service to the remote user, the host application 712 may provide user data which is transmitted using the OTT connection 750.

The communication system 700 further includes a base station 720 provided in a telecommunication system and comprising hardware 725 enabling it to communicate with the host computer 710 and with the UE 730. The hardware 725 may include a communication interface 726 for setting up and maintaining a wired or wireless connection with an interface of a different communication device of the communication system 700, as well as a radio interface 727 for setting up and maintaining at least a wireless connection 770 with a UE 730 located in a coverage area (not shown in FIG. 7) served by the base station 720. The communication interface 726 may be configured to facilitate a connection 760 to the host computer 710. The connection 760 may be direct or it may pass through a core network (not shown in FIG. 7) of the telecommunication system and/or through one or more intermediate networks outside the telecommunication system. In the embodiment shown, the hardware 725 of the base station 720 further includes processing circuitry 728, which may comprise one or more programmable processors, application-specific integrated circuits, field programmable gate arrays or combinations of these (not shown) adapted to execute instructions. The base station 720 further has software 721 stored internally or accessible via an external connection.

The communication system 700 further includes the UE 730 already referred to. Its hardware 735 may include a radio interface 737 configured to set up and maintain a wireless connection 770 with a base station serving a coverage area in which the UE 730 is currently located. The hardware 735 of the UE 730 further includes processing circuitry 738, which may comprise one or more programmable processors, application-specific integrated circuits, field programmable gate arrays or combinations of these (not shown) adapted to execute instructions. The UE 730 further comprises software 731, which is stored in or accessible by the UE 730 and executable by the processing circuitry 738. The software 731 includes a client application 732. The client application 732 may be operable to provide a service to a human or non-human user via the UE 730, with the support of the host computer 710. In the host computer 710, an executing host application 712 may communicate with the executing client application 732 via the OTT connection 750 terminating at the UE 730 and the host computer 710. In providing the service to the user, the client application 732 may receive request data from the host application 712 and provide user data in response to the request data. The OTT connection 750 may transfer both the request data and the user data. The client application 732 may interact with the user to generate the user data that it provides.

Figure 7:
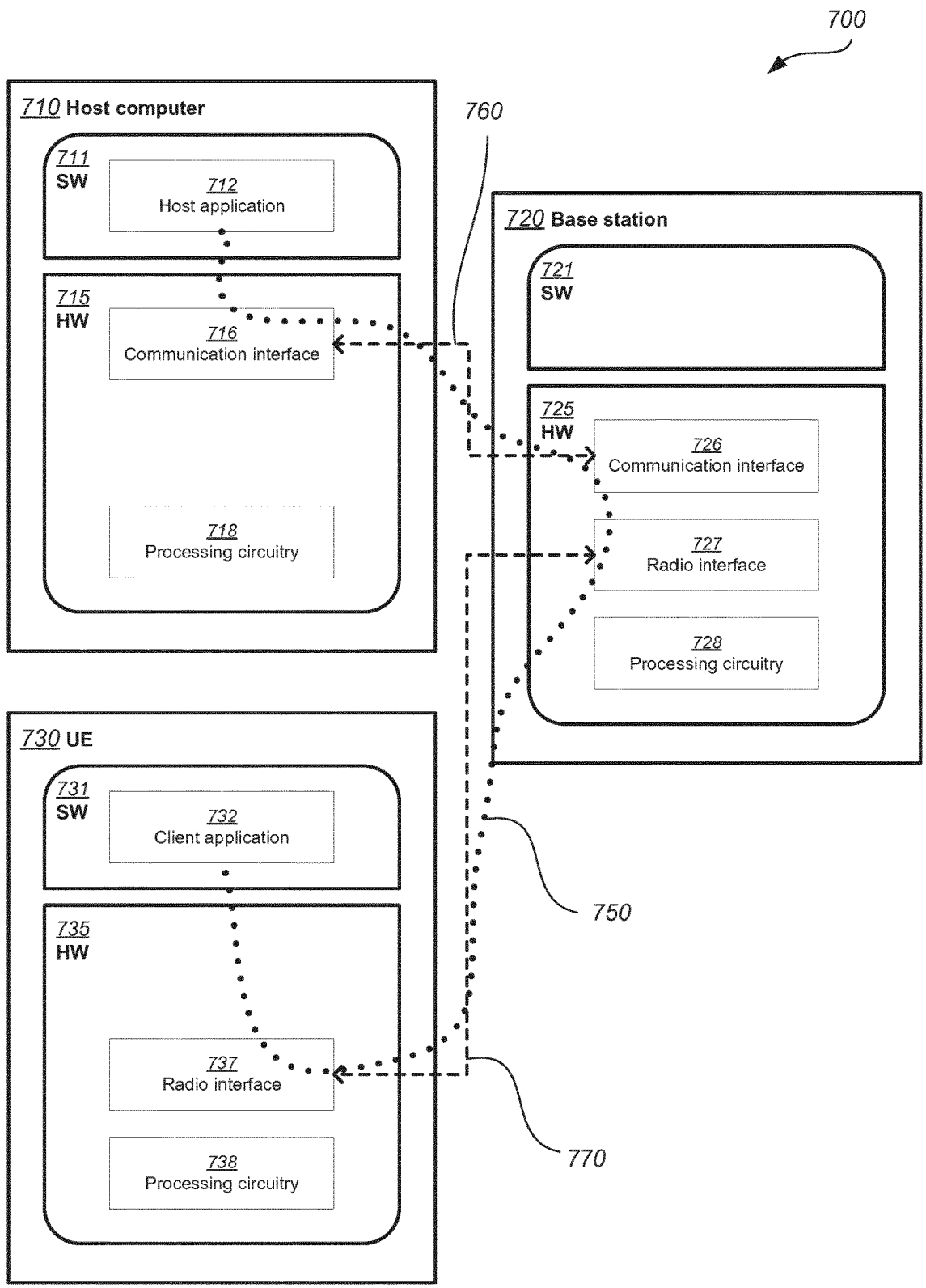
FIG. 7 is a generalized block diagram of a host computer communicating via a base station with a user equipment over a partially wireless connection, according to some embodiments.

It is noted that the host computer 710, base station 720 and UE 730 illustrated in FIG. 7 may be identical to the host computer 630, one of the base stations 612a, 612b, 612c and one of the UEs 691, 692 of FIG. 6, respectively. This is to say, the inner workings of these entities may be as shown in FIG. 7 and independently, the surrounding network topology may be that of FIG. 6.

In FIG. 7, the OTT connection 750 has been drawn abstractly to illustrate the communication between the host computer 710 and the use equipment 730 via the base station 720, without explicit reference to any intermediary devices and the precise routing of messages via these devices. Network infrastructure may determine the routing, which it may be configured to hide from the UE 730 or from the service provider operating the host computer 710, or both. While the OTT connection 750 is active, the network infrastructure may further take decisions by which it dynamically changes the routing (e.g., on the basis of load balancing consideration or reconfiguration of the network).

The wireless connection 770 between the UE 730 and the base station 720 is in accordance with the teachings of the embodiments described throughout this disclosure, such as provided by nodes such as wireless device 50 and network node 30, along with the corresponding method 500. The various embodiments allow a device to temporarily camp on the non-anchor carrier configured for paging/random access and perform a limited set of RRM measurement procedures on the non-anchor carrier. More precisely, the teachings of these embodiments may allow UE 730 to limit its RF switching to save power, using the OTT connection 750, and thereby provide benefits such as better responsiveness and better device battery time.

A measurement procedure may be provided for the purpose of monitoring data rate, latency and other factors on which the one or more embodiments improve. There may further be an optional network functionality for reconfiguring the OTT connection 750 between the host computer 710 and UE 730, in response to variations in the measurement results. The measurement procedure and/or the network functionality for reconfiguring the OTT connection 750 may be implemented in the software 711 of the host computer 710 or in the software 731 of the UE 730, or both. In embodiments, sensors (not shown) may be deployed in or in association with communication devices through which the OTT connection 750 passes; the sensors may participate in the measurement procedure by supplying values of the monitored quantities exemplified above, or supplying values of other physical quantities from which software 711, 731 may compute or estimate the monitored quantities. The reconfiguring of the OTT connection 750 may include message format, retransmission settings, preferred routing etc.; the reconfiguring need not affect the base station 720, and it may be unknown or imperceptible to the base station 720. Such procedures and functionalities may be known and practiced in the art. In certain embodiments, measurements may involve proprietary UE signaling facilitating the host computer's 710 measurements of throughput, propagation times, latency and the like. The measurements may be implemented in that the software 711, 731 causes messages to be transmitted, in particular empty or 'dummy' messages, using the OTT connection 750 while it monitors propagation times, errors etc.

Figure 8:
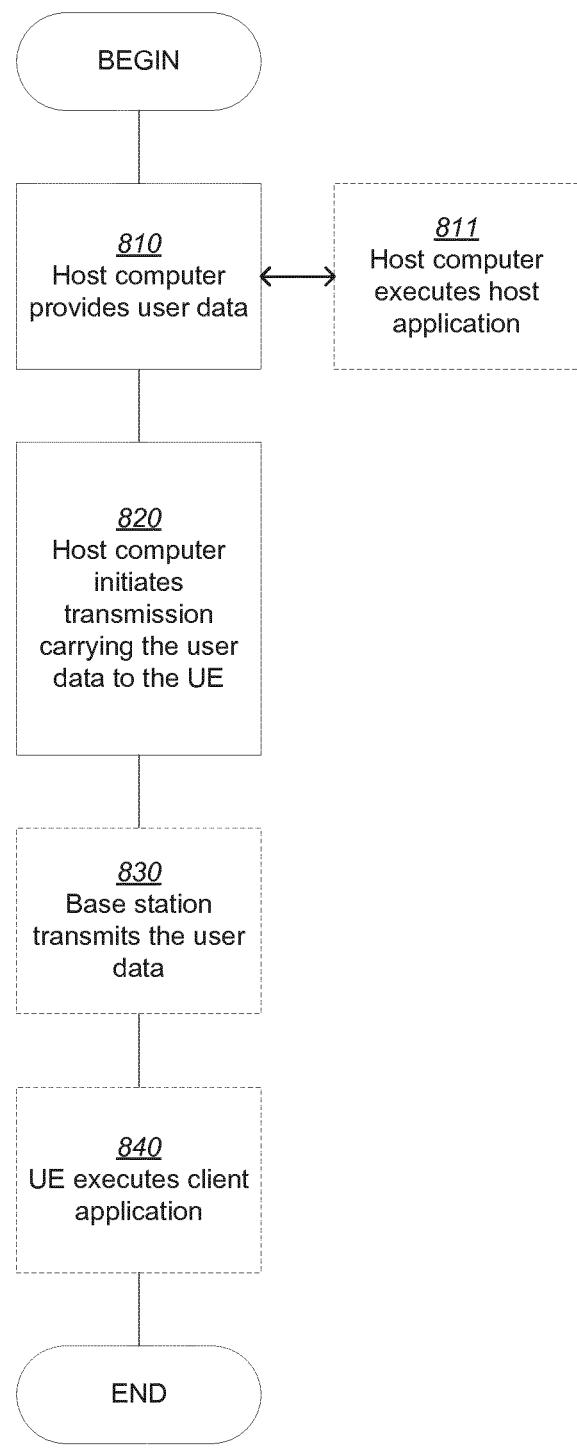
FIGS. 8, 9, 10, and 11 are flowcharts illustrating example methods implemented in a communication system including a host computer, a base station and a user equipment.

FIG. 8 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 8 will be included in this section. In a first step 810 of the method, the host computer provides user data. In an optional substep 811 of the first step 810, the host computer provides the user data by executing a host application. In a second step 820, the host computer initiates a transmission carrying the user data to the UE. In an optional third step 830, the base station transmits to the UE the user data which was carried in the transmission that the host computer initiated, in accordance with the teachings of the embodiments described throughout this disclosure. In an optional fourth step 840, the UE executes a client application associated with the host application executed by the host computer.

Figure 9:
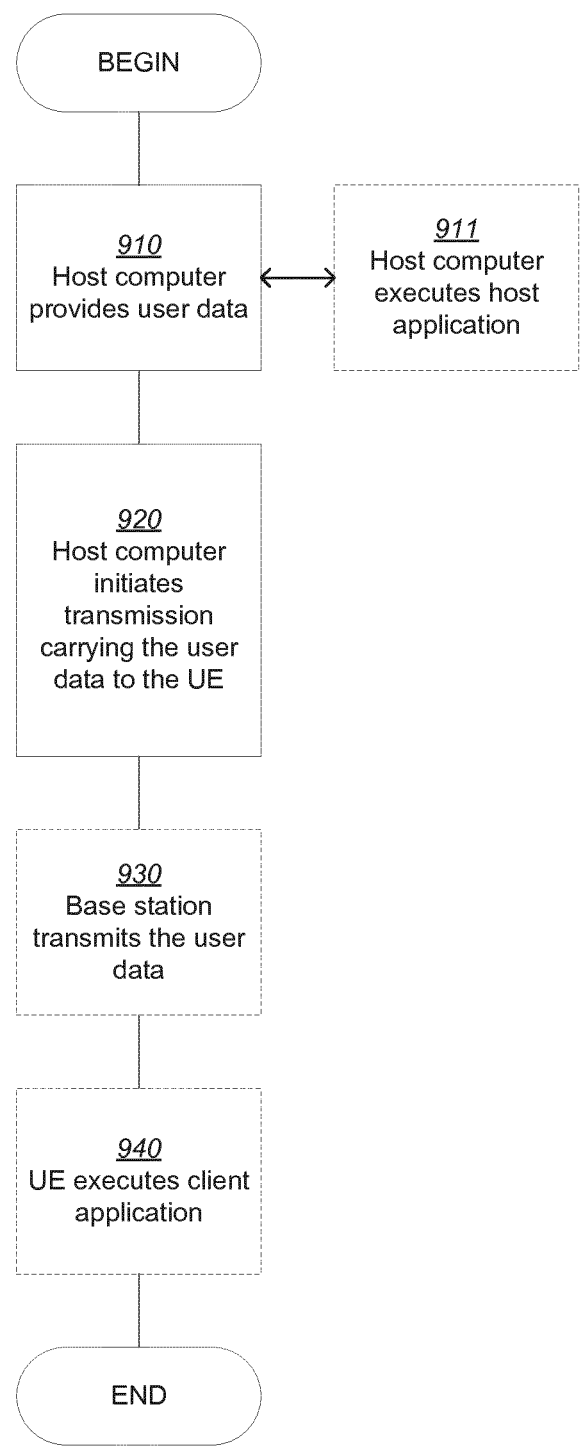

FIG. 9 is a flowchart illustrating a method implemented in a communication system, in accordance with one embodiment. The communication system includes a host computer, a base station and a UE, which may be those described with reference to FIGS. 6 and 7. For simplicity of the present disclosure, only drawing references to FIG. 9 will be included in this section. In a first step 910 of the method, the host computer provides user data. In an optional substep (not shown) the host computer provides the user data by executing a host application. In a second step 920, the host computer initiates a transmission carrying the user data to the UE. The transmission may pass via the base station, in accordance with the teachings of the embodiments described throughout this disclosure. In an optional third step 930, the UE receives the user data carried in the transmission.

Figure 10:
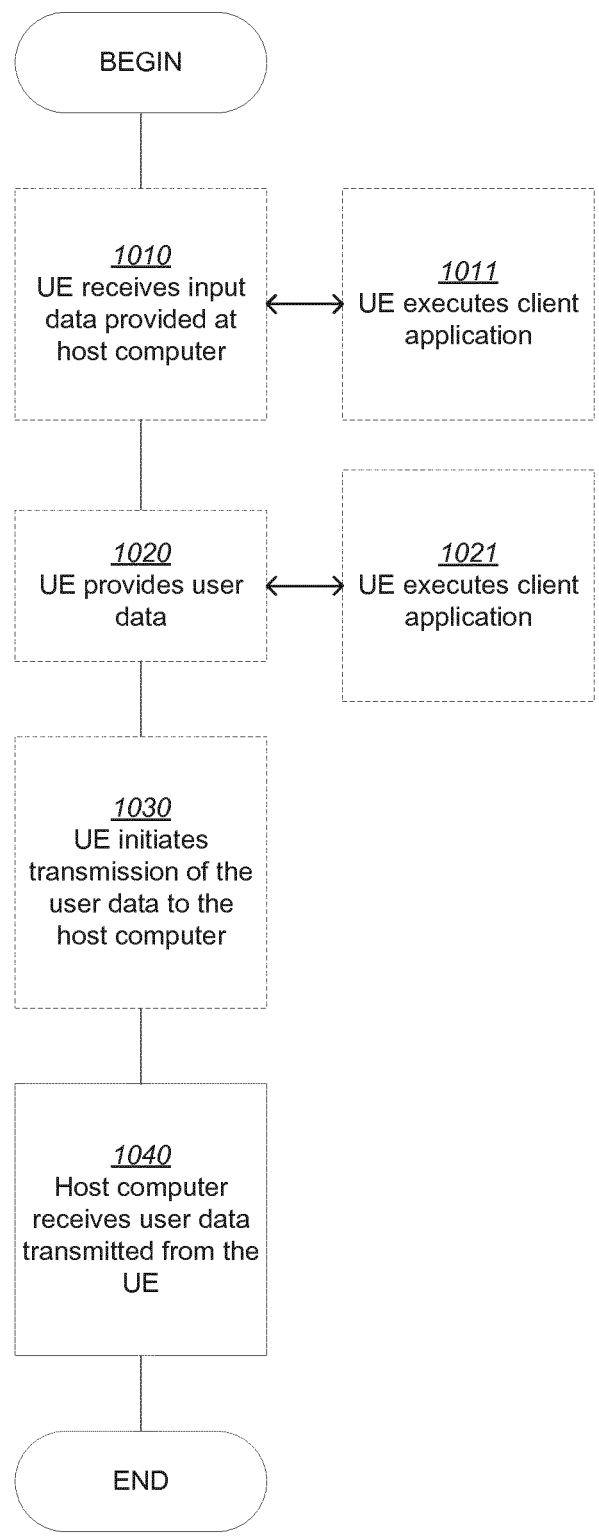

FIG. 10 is a flowchart illustrating a method implemented in a communication system, in accordance with one embodiment. The communication system includes a host computer, a base station and a UE, which may be those described with reference to FIGS. 6 and 7. For simplicity of the present disclosure, only drawing references to FIG. 10 will be included in this section. In an optional first step 1010 of the method, the UE receives input data provided by the host computer. Additionally, or alternatively, in an optional second step 1020, the UE provides user data. In an optional substep 1021 of the second step 1020, the UE provides the user data by executing a client application. In a further optional substep 1011 of the first step 1010, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1030, transmission of the user data to the host computer. In a fourth step 1040 of the method, the host computer receives the user data transmitted from the UE, in accordance with the teachings of the embodiments described throughout this disclosure.

Figure 11:
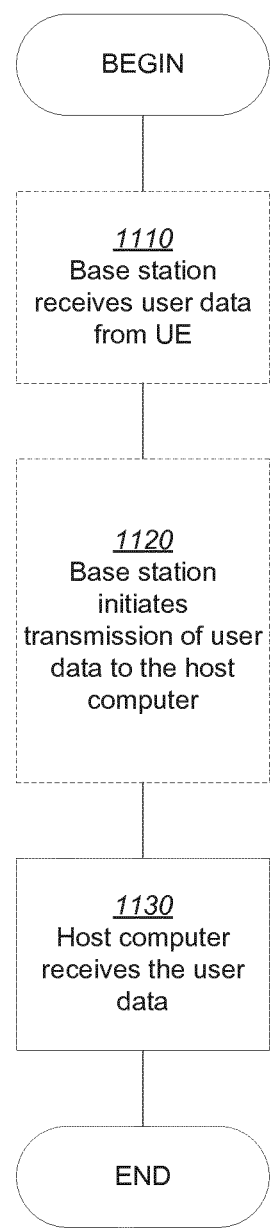

FIG. 11 is a flowchart illustrating a method implemented in a communication system, in accordance with one embodiment. The communication system includes a host computer, a base station and a UE which may be those described with reference to FIGS. 6 and 7. For simplicity of the present disclosure, only drawing references to FIG. 11 will be included in this section. In an optional first step 1110 of the method, in accordance with the teachings of the embodiments described throughout this disclosure, the base station receives user data from the UE. In an optional second step 1120, the base station initiates transmission of the received user data to the host computer. In a third step 1130, the host computer receives the user data carried in the transmission initiated by the base station.

As discussed in detail above, the techniques described herein, e.g., as illustrated in the process flow diagram of FIG. 5, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 12:
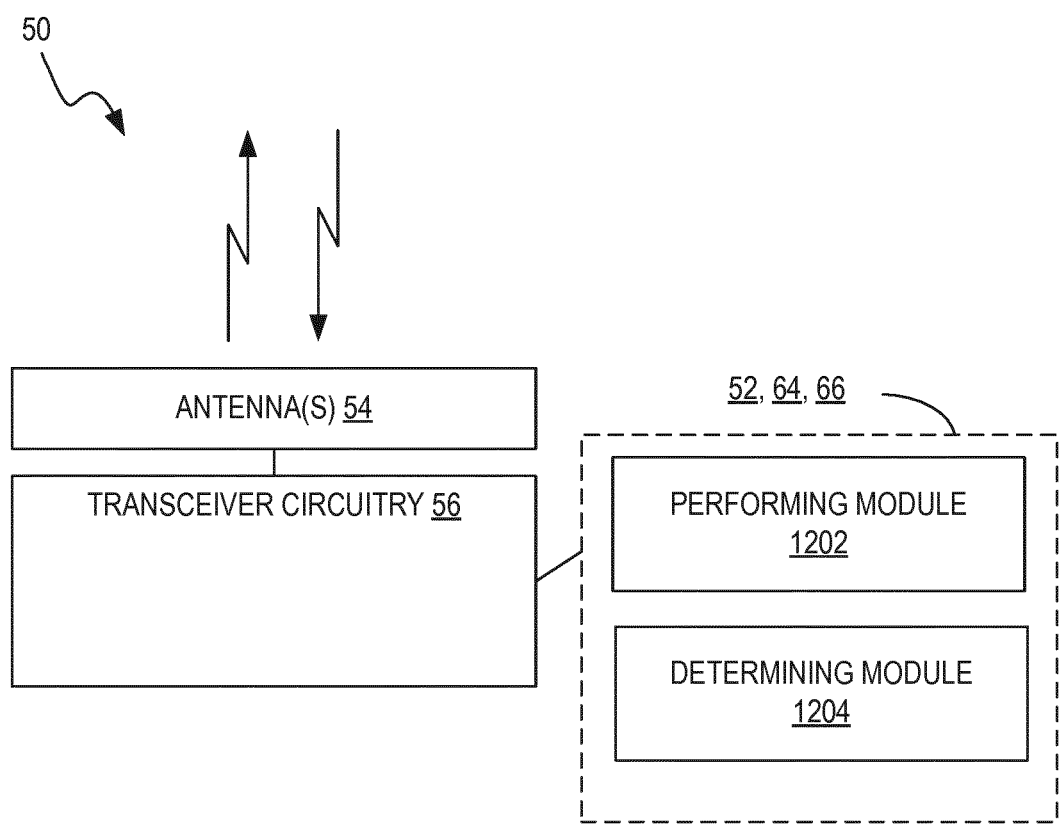
FIG. 12 is a block diagram illustrating a functional implementation of a wireless device for, according to some embodiments.

FIG. 12 illustrates an example functional module or circuit architecture as may be implemented in a wireless device 50 operating in a wireless communication network, where wireless device 50 is configured to operate on a first carrier, the first carrier supporting a broadcast of system information, providing for paging and random access, and supporting idle-mode measurements, the wireless device being further adapted for operation on a second carrier, distinct from the first carrier, the second carrier also providing for paging and random access. The implementation includes a performing module 1502 for performing a signal strength measurement or quality measurement, or both, on each of the first and second carriers. The implementation also includes a determining module 1504 for, based on the signal strength or quality measurement, or both, for each of the respective carriers, determining whether to perform idle-mode RRM measurements on the second carrier.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

The invention claimed is:

1. A method, performed by a wireless device, for performing idle mode radio resource management (RRM) measurements in a wireless network, the wireless network comprising a first carrier that supports a broadcast of system information, provides radio resources for paging and random access, and the wireless network further comprising a second carrier, distinct from the first carrier, that also provides radio resources for paging and random access, the first carrier being an anchor carrier for the wireless device and the second carrier being a non-anchor carrier for the wireless device, the method comprising:

receiving one or more conditions for permitting the wireless device to camp on the non-anchor carrier whilst monitoring for paging or random access on the non-anchor carrier, wherein camping comprises performing RRM measurements on the non-anchor carrier for the wireless device and as a result determining whether cell reselection can be directly performed based on one or more measurements of the non-anchor carrier;

performing at least one of a signal strength measurement and a signal quality measurement, on each of the first and second carriers;

comparing the signal strength measurement or quality measurement for each of the first and second carriers to a first pre-configured threshold; and in response to determining that the at least one measurement for both of the first and second carriers exceeds the first pre-configured threshold, determining to perform idle-mode RRM measurements on the second carrier and to discontinue idle-mode RRM measurements on the first carrier.

2. The method of claim 1, wherein the first carrier and the second carrier are narrowband Internet-of-Things (NB-IoT) carriers.

3. The method of claim 1, wherein the one of the signal strength and quality measurement for each of the first and second carriers is an average or weighted average measurement.

4. The method of claim 1, wherein the method further comprises subsequently resuming idle-mode RRM measurements on the first carrier, in response to determining one of:
that one or a predetermined number of signal strength measurements or quality measurements for the second carrier fall below a second pre-configured threshold;
that one or an average of several signal strength measurements or quality measurements for the second carrier falls below one or an average of several previous signal strength measurements or quality measurements by at least a predetermined difference;
that idle-mode RRM measurements have been performed on the second carrier for a predetermined period of time.

5. The method of claim 1, wherein the method further comprises:
performing cell-reselection, using most recent signal strength measurements or quality measurements for each of the first and second carriers, in response to determining that one or a predetermined number of signal strength measurements or quality measurements for the second carrier fall below a pre-configured threshold.

6. The method of claim 1, wherein the method comprises comparing the signal strength measurement or quality measurement for the first carrier to the respective signal strength measurement for the second carrier, and, in response to determining that a difference between the signal strength measurement or quality measurement for the first and second carriers is below a pre-configured delta threshold, determining to initiate idle-mode RRM measurements on the second carrier and to discontinue idle-mode RRM measurements on the first carrier.

7. The method of claim 6, wherein the method further comprises, in response to determining that one or an average of several signal strength measurements or quality measurements for the second carrier falls below one or an average of several previous signal strength measurements or quality measurements by at least a predetermined difference; performing one of:
resuming idle-mode RRM measurements on the first carrier; and
cell-reselection, using most recent signal strength measurements or quality measurements for each of the first and second carriers.

8. The method of claim 6, wherein the pre-configured delta threshold is set based on a difference in transmit power from the network between the first carrier and the second carrier.

9. The method of claim 8, wherein the method further comprises inferring the difference in transmit power based on a power offset information element received by the wireless device.

10. A wireless device adapted to perform idle mode radio resource management (RRM) measurements in a wireless network, the wireless network comprising a first carrier that supports a broadcast of system information, provides radio resources for paging and random access, and, the wireless network further comprising a second carrier, distinct from the first carrier, that also provides radio resources for paging and random access, the first carrier being an anchor carrier for the wireless device and the second carrier being a non-anchor carrier for the wireless device, the wireless device comprising:

transceiver circuitry configured for communicating with a wireless communication network on the first and second carriers; and processing circuitry operatively associated with the transceiver circuitry and configured to:
receive one or more conditions for permitting the wireless device to camp on a non-anchor carrier whilst monitoring for paging or random access on the non-anchor carrier, wherein camping comprises performing RRM measurements on a non-anchor carrier for the wireless device and as a result determining whether cell reselection can be directly performed based on one or more measurements of the non-anchor carrier;
perform at least one of a signal strength measurement and a signal quality measurement on each of the first and second carriers;
compare the signal strength measurement or quality measurement for each of the first and second carriers to a first pre-configured threshold; and
in response to determining that the at least one measurement for both of the first and second carriers exceeds the first pre-configured threshold, determine to perform idle-mode RRM measurements on the second carrier and to discontinue idle-mode RRM measurements on the first carrier.

11. The wireless device of claim 10, wherein the first carrier and the second carrier are narrowband Internet-of-Things (NB-IoT) carriers.

12. The wireless device of claim 10, wherein the one of the signal strength and measurement for each of the first and second carriers is an average or weighted average measurement.

13. The wireless device of claim 10, wherein the processing circuitry is configured to subsequently resume idle-mode RRM measurements on the first carrier, in response to determining one of:
that one or a predetermined number of signal strength measurements or quality measurements for the second carrier fall below a second pre-configured threshold;
that one or an average of several signal strength measurements or quality measurements for the second carrier falls below one or an average of several previous signal strength measurements or quality measurements by at least a predetermined difference; and
that idle-mode RRM measurements have been performed on the second carrier for a predetermined period of time.

14. The wireless device of claim 10, wherein the processing circuitry is configured to:
perform cell-reselection, using most recent signal strength measurements or quality measurements for each of the first and second carriers, in response to determining that one or a predetermined number of signal strength measurements or quality measurements for the second carrier fall below a pre-configured threshold.

15. The wireless device of claim 10, wherein the processing circuitry is configured to compare the signal strength measurement or quality measurement for the first carrier to the respective signal strength measurement for the second carrier, and, in response to determining that a difference between the signal strength measurement or quality measurement for the first and second carriers is below a pre-configured delta threshold, determine to initiate idle-mode RRM measurements on the second carrier and to discontinue idle-mode RRM measurements on the first carrier.

16. The wireless device of claim 15, wherein the processing circuitry is configured to,
in response to determining that one or an average of several signal strength measurements or quality measurements for the second carrier falls below one or an average of several previous signal strength measurements or quality measurements by at least a predetermined difference, perform one of:
resuming idle-mode RRM measurements on the first carrier; and
cell-reselection, using most recent signal strength measurements or quality measurements for each of the first and second carriers.

17. The wireless device of claim 15, wherein the pre-configured delta threshold is set based on a difference in transmit power from the network between the first carrier and the second carrier.

18. The wireless device of claim 17, wherein the processing circuitry is configured to infer the difference in transmit power based on a power offset information element received by the wireless device.

19. A method, performed by a network node, for facilitating idle mode radio resource management (RRM) measurements in a wireless network, the wireless network comprising a first carrier that supports a broadcast of system information, provides radio resources for paging and random access, and, the wireless network further comprising a second carrier, distinct from the first carrier, that also provides radio resources for paging and random access, the first carrier being an anchor carrier for the wireless device and the second carrier being a non-anchor carrier for the wireless device, the method comprising:
signaling, to a wireless device in the network, one or more conditions for permitting the wireless device to camp on the non-anchor carrier whilst monitoring for paging or random access on the non-anchor carrier, camping comprising performing RRM measurements on the non-anchor carrier for the wireless device; and
comparing a signal strength measurement or quality measurement for each of the anchor carrier and non-anchor carrier to a first pre-configured threshold and, in response to determining that the at least one measurement for both of the anchor and non-anchor carriers exceeds the first pre-configured threshold, determining to perform idle-mode RRM measurements on the non-anchor carrier and to discontinue idle-mode RRM measurements on the anchor carrier.

20. The method of claim 19, wherein the method comprises signaling, to the wireless device, the threshold for use by the wireless device in determining whether to perform RRM measurements on a non-anchor carrier for the wireless device.

21. The method of claim 19, wherein the method comprises indicating, to the wireless device, whether cell reselection can be directly performed based on one or more measurements of the non-anchor carrier.

22. A network node adapted for facilitating idle mode radio resource management (RRM) measurements in a wireless network, the wireless network comprising a first carrier that supports a broadcast of system information, provides radio resources for paging and random access, and, the wireless network further comprising a second carrier, distinct from the first carrier, that also provides radio resources for paging and random access, the first carrier being an anchor carrier for the wireless device and the second carrier being a non-anchor carrier for the wireless device, the network node comprising:
transceiver circuitry configured for communicating with a wireless communication network on the first and second carriers; and
processing circuitry operatively associated with the transceiver circuitry and configured to:
signal, to a wireless device in the network, one or more conditions for permitting the wireless device to camp on the non-anchor carrier whilst monitoring for paging or random access on the non-anchor carrier, camping comprises comprising performing RRM measurements on the non-anchor carrier for the wireless device and as a result determining whether cell reselection can be directly performed based on one or more measurements of the non-anchor carrier; and
compare a signal strength measurement or quality measurement for each of the anchor carrier and non-anchor carrier to a first pre-configured threshold and, in response to determining that the at least one measurement for both of the anchor and non-anchor carriers exceeds the first pre-configured threshold, determining to perform idle-mode RRM measurements on the non-anchor carrier and to discontinue idle-mode RRM measurements on the anchor carrier.

23. The network node of claim 22, wherein the processing circuitry is further configured to signal, to the wireless device, one of:
the threshold for use by the wireless device in determining whether to perform RRM measurements on a non-anchor carrier for the wireless device; and
an indication to indicate, to the wireless device, whether cell reselection can be directly performed based on one or more measurements of the non-anchor carrier.

* * * * *